(12) United States Patent
Boman et al.

(10) Patent No.: US 7,085,635 B2
(45) Date of Patent: Aug. 1, 2006

(54) ENHANCED AUTOMOTIVE MONITORING SYSTEM USING SOUND

(75) Inventors: Robert C Boman, Thousand Oaks, CA (US); Roland Kuhn, Santa Barbara, CA (US); Brian Hanson, Goleta, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 298 days.

(21) Appl. No.: 10/831,926

(22) Filed: Apr. 26, 2004

(65) Prior Publication Data

US 2005/0240324 A1 Oct. 27, 2005

(51) Int. Cl.
*G08G 1/052* (2006.01)
*G10L 19/12* (2006.01)
*G06F 17/00* (2006.01)

(52) U.S. Cl. .................... 701/36; 701/35; 701/117; 701/119; 704/221; 704/246; 704/251; 340/905; 340/936

(58) Field of Classification Search ............ 701/1, 701/35, 91, 96, 200, 117, 119; 340/436, 340/905, 936, 441, 426.1, 573.1; 704/200, 704/221, 243, 246, 231, 236, 251; 180/272
See application file for complete search history.

(56) References Cited

U.S. PATENT DOCUMENTS

| 6,112,174 | A | * | 8/2000 | Wakisaka et al. ........... 704/251 |
|---|---|---|---|---|
| 6,122,682 | A | * | 9/2000 | Andrews ..................... 710/65 |
| 6,240,347 | B1 | * | 5/2001 | Everhart et al. ............. 701/36 |
| 6,243,685 | B1 | * | 6/2001 | Welch et al. ............... 704/276 |
| 6,720,889 | B1 | * | 4/2004 | Yamaki et al. .............. 340/933 |
| 6,914,541 | B1 | * | 7/2005 | Zierden ...................... 340/937 |
| 2002/0163426 | A1 | | 11/2002 | Moskowitz .............. 340/428.1 |
| 2003/0098792 | A1 | | 5/2003 | Edwards et al. .......... 340/573.1 |

* cited by examiner

*Primary Examiner*—Tan Q. Nguyen
(74) *Attorney, Agent, or Firm*—Harness, Dickey & Pierce, PLC

(57) ABSTRACT

The vehicular monitoring system obtains audio information from the speech of occupants within the vehicle and then processes that audio information to extract information about the behavior of the vehicle occupants. Using the behavioral information the system then assesses whether said behavior is in compliance with a predefined set of rules. Severe violations are reported to a third party via cellular telephone or other means. Less severe violations are recorded in a log file that is subsequently uploaded to a networked computer system for review and analysis. The behavioral rules used to assess violations may be modified by the administrative user.

27 Claims, 2 Drawing Sheets

ENHANCED AUTOMOTIVE MONITORING SYSTEM USING SOUND

BACKGROUND OF THE INVENTION

The present invention relates generally to electronic systems for automotive vehicles. More particularly, the invention relates to a parental guidance and driver security system that utilizes sound and voice analysis to ascertain whether the vehicle operator is conforming to predefined behavioral rules.

Teenage drivers have high accident rates. Parents would like to be able to monitor the driving habits of their children, but this can be difficult because the parents are not always present when the children are driving. Attempts to address this problem in the past have centered primarily around receiving reports from other persons. For example, there is a service known as Safe Teen that uses a reporting system to monitor teenage drivers. The system works by placing a sticker in the back of the vehicle. The sticker has a phone number and a web page. It also has a number that identifies the vehicle. When other drivers observe the vehicle performing unsafe actions, the other drivers can report the actions to the Safe Teen service using either the published phone number or the web page. In this way, the parents can be informed if their children are using the vehicle in an unsafe manner and can take appropriate action.

In addition to teenage drivers, there are similar issues with trucking companies, delivery companies, and with drivers having a history of drunk driving. In all of these cases, it would be desirable to monitor the vehicle usage so that if the vehicle is being driven dangerously, corrective action can be taken before an accident occurs.

SUMMARY OF THE INVENTION

The system uses one or more microphones placed in the vehicle to monitor the occupants. Those drivers and passengers who are authorized to be in the vehicle will have been registered with the system using voiceprints which are taken by simply speaking into the microphone at registration time. Using speaker identification and speaker clustering, the system can keep track of the number and identity of the vehicle occupants. Sounds picked up by the in-car microphone(s) are also scanned for topic detection, to detect possible unauthorized activities. For example, if words such as "police," "catch," and "run" are used many times in close proximity, this would potentially indicate that an infraction of the rules is in progress. The system would then report such infraction via either cellular telephone or other network wireless communication. Topic detection is performed using statistical methods, which makes the system less prone to false alarm when isolated words are spoken. Other sensors within the vehicle, such as global positioning satellite (GPS) sensors or other "sniffer" sensors provide additional information about the vehicles location and the behavior of the vehicle occupants. Chemical sniffers, for example, may detect traces of alcohol or drugs or other chemicals that might impair the vehicle occupants.

For a more complete understanding of the invention, its objects and advantages, reference may be had to the remaining specification and to the accompanying drawings.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
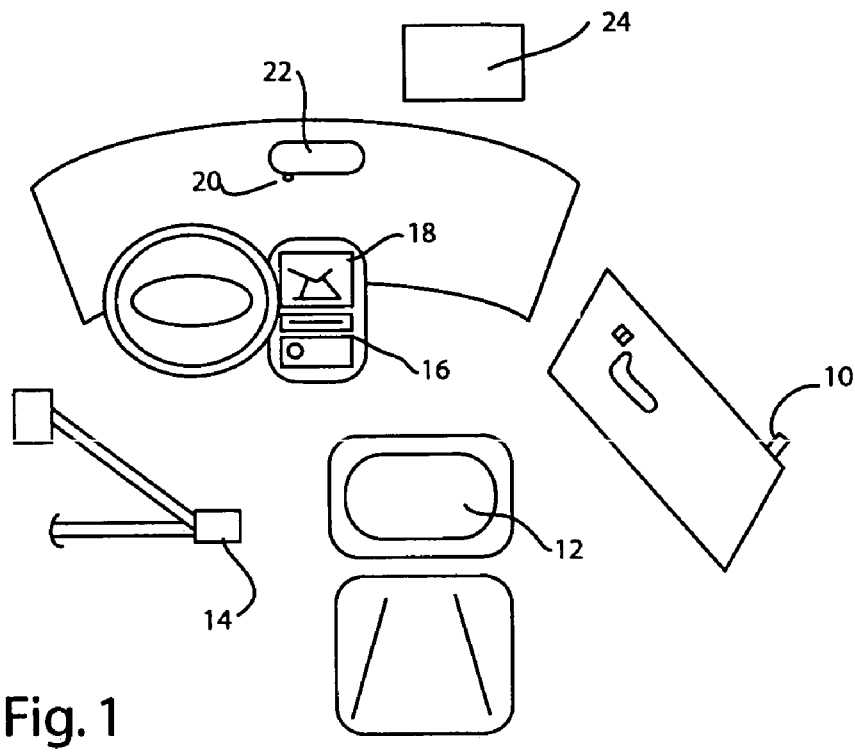
FIG. 1 is an exploded plan view of the interior of the vehicle, useful in understanding the invention.

Referring to FIG. 1, the interior of an exemplary vehicle has been illustrated. Although the present invention can be implemented using different assortments of sensors, a presently preferred embodiment uses, where possible, existing sensors already deployed in modern day vehicles. Thus, the automotive system includes a door sensor 10 that provides information as to whether the associated vehicle door is open or closed, and whether the door is locked or unlocked. A seat sensor 12 provides information as to whether the vehicle seat is occupied or not. Similarly, the seatbelt sensor 14 provides information as to whether the seatbelt is fastened or not.

The illustrated vehicle includes an audio system 16 and a global positioning satellite (GPS) navigation system 18. As will be more fully explained, information is obtained from the audio system 16 and the GPS system 18 for use in determining whether the vehicle occupants are abiding by predefined rules. For example, the volume level of the audio system can be ascertained to determine whether the occupants are listening to the audio system at too loud a volume. GPS information may be used, for example, to determine if the vehicle is being driven to locations that are not approved.

In the presently preferred embodiment, one or more microphones are provided to obtain sound samples from within the vehicle passenger compartment. For purposes of illustration, a microphone 20 is shown, integrated into the housing of rear view mirror 22. Other locations for microphones are also possible. These might include in the vehicle headliner, sun visors, audio system, dashboard, and the light. In addition, microphones can also be placed to pick up sounds originating from sources outside the vehicle passenger compartment. A microphone could thus be positioned to monitor the tires for sounds of squealing.

The illustrated embodiment may be integrated with the vehicle onboard computer system 24, if desired. In a typical automotive vehicle, the vehicle computer system 24 receives sensor information from a variety of sources, including RPM information, speedometer information, and the like. As will be more fully explained, some of the information gathered by the vehicle computer system 24 may be used by the automotive monitoring system of the invention.

Figure 2:
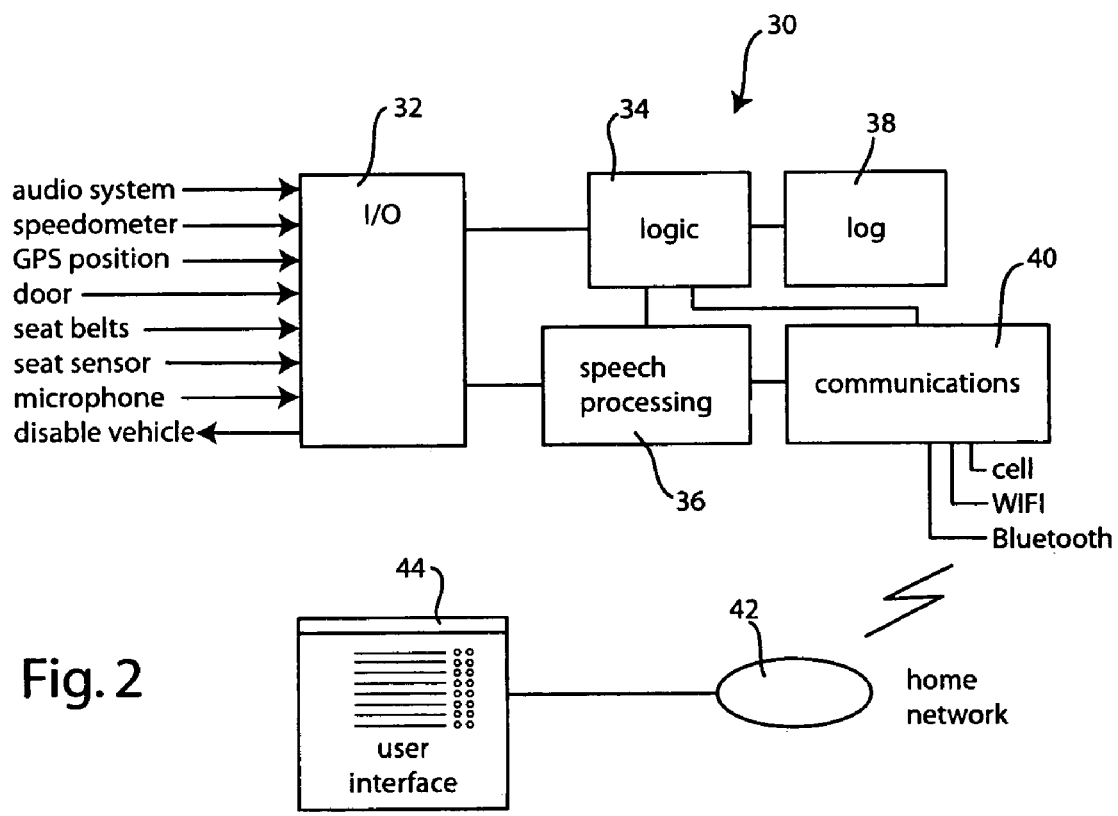
FIG. 2 is a system block diagram of a first embodiment of the invention.

FIG. 2 shows one presently preferred implementation of the automotive monitoring system. The automotive monitoring system is shown generally at 30. It includes an input/output (I/O) interface 32 that is designed to receive signals from a variety of different sources and also configured to provide control signals back to the vehicle engine computer 24. As illustrated, the input/output interface 32 receives information from the audio system, the speedometer, the GPS system, the door sensor, the seat belt sensors, the seat sensors, the microphone or microphones, and potentially other sensors such as chemical sniffer sensors, vehicle RPM sensors, and the like. The input/output interface is coupled to a system logic module 34 and also to a speech processing module 36. The logic module is coupled to the speech processing module and performs certain logical functions used to determine whether the vehicle driver and/or vehicle occupants are violating any predefined rules. The logic module includes a data memory storage unit 38 into which the laws of violations is written and read. The logic module 34 is also coupled to the communications module 40 that provides basic communications via one or more wireless technologies such as cellular telephone, WIFI, Bluetooth, and the like. The communications module 40 is designed to send messages using synthesized speech and/or sound file information captured using the microphones to a designated telephone number or numbers. The WIFI and Bluetooth communication links can be used to supply data to a local area network such as a home network 42.

The logic module 34 is configured to assess information received through the input/output interface to determine whether there are any rule violations being committed by the vehicle driver or its occupants. The logic module may be configured by the user through a suitable user interface, such as user interface 44 which is hosted by a suitable computer system, such as a computer system forming part of home network 42. The user (i.e., parent) places rules into the user interface 44, designating which rules and/or combination of rules would constitute a severe violation if not complied with. For example, the parental user might configure the system to consider a severe violation to exist if drugs or alcohol are detected or if the vehicle speed exceeds 60 mph. The parental user might impose other rules that are not serious enough to themselves constitute a severe violation, but which nevertheless need to be recorded in the violation log file. For example, the parental user might configure the system to log where the vehicle has been driven so that the log can be consulted later to determine if the driver has disobeyed parental rules.

The logic module 34 thus stores the rules input by the parental user within a portion of the memory 38. As data are received from the input/output interface, the logic module stores that data in the log file within memory 38 and also, when severe violations are detected, sends a communication through the communications module 40 to the parental user. When the vehicle is within communication range of the home network 42, the communications module uploads the contents of the log file into the home network, where the data may be further examined by the parental user.

While the system can be configured to define set of conditions or operations as a violation, the following are exemplary:

Unauthorized driver (detected with speaker verification, speaker location used if more than one person is in vehicle at the time of speaker identification)

Unauthorized number of passengers (detected with speaker clustering and/or seat belt sensors)

Unknown passenger presence (detected by speaker clustering and verification)

Driving at an unauthorized time of day (uses an internal clock)

Driving to an unauthorized location (requires GPS)

Driving with music too loud

Tire squealing (detected with microphone and signal processing)

Detection of certain speech topics suggestive of unauthorized behavior

Speeding (requires speedometer and possibly GPS inputs)

While the parental user may elect to have other actions taken when violations are detected, the following actions are exemplary:

Recording the violation in an electronic log book (this will be the most common)

Recording the sound from the microphone(s) to be played back later

Calling a predefined phone number (requires cellular telephone circuitry)

Warning the vehicle occupants with a speech recording

Sending a notification message using text messaging or email

Preventing use of the vehicle (perhaps disabling it the next time it is parked)

The type of action taken can depend on the severity of the violation.

The system determines the identity of the vehicle driver using speaker verification and/or speaker identification. When the vehicle is started, the system asks the driver to identify himself or herself. The system then checks the voice against its store of voiceprints. Knowledge of each user's voiceprint is obtained during a registration process. The system is placed into registration mode and the user is asked to say his or her name (or other identifying information). The user's utterance is then statistically processed to define a parametric representation of that speaker's voice and identity. If desired the registration process can be repeated under different ambient noise conditions to improve the robustness of the voiceprint.

Figure 3:
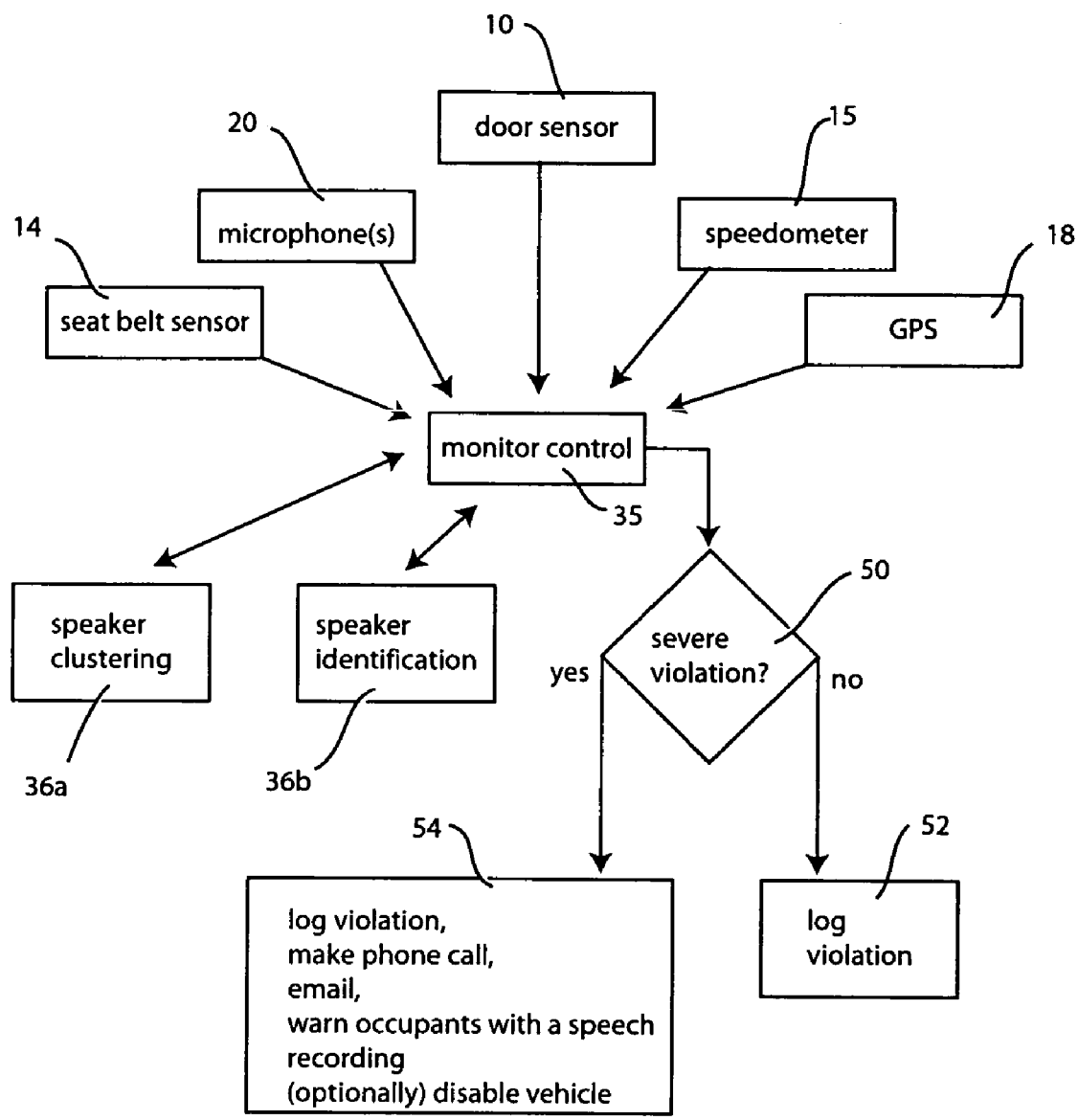
FIG. 3 is an information flow diagram explaining the operational principals of the invention.

If desired, the system may be configured so that each time the seat belt is disconnected, the driver will need to re-identify himself or herself, so that the system can detect cases where the driver changes. FIG. 3 illustrates how the invention operates. More specifically, FIG. 3 shows a set of exemplary input signals and the resulting action that will be taken, based on the severity of the violation, as defined by the preconfigured rules set by the parental user. The logic module 34 (FIG. 2) implements a monitor control algorithm 35. The monitor control algorithm receives data from various sources, such as those illustrated in FIG. 3, namely: seat belt sensor 14, microphones 20, door sensor 10, speedometer 15 and GPS 18. The monitor control algorithm utilizes the services of the speech processing module 36 (FIG. 1) to ascertain speaker identity using speaker clustering techniques as will be described below. Thus, in FIG. 3, the speaker clustering functionality 36a and the speaker identification functionality 36b of the speech processing module 36 have been illustrated.

The monitor control algorithm accesses the inputs, making use of the speech processing module as needed, and ultimately determines if a violation has occurred. As depicted at 50, the monitor control algorithm may be configured to discriminate between severe violations and minor violations. For minor violations, the system is configured to simply make a log entry as indicated at 52. For severe violations, the system is configured to make a log entry and then, in addition, notify the parental user through appropriate means. These means include making a phone call, sending an email message or both.

Messages sent by phone or email are handled by the communications module 40 (FIG. 2). The communications module may draw upon services of the speech processing module 36 to produce synthesized speech messages suitable for sending via phone. In addition, the speech processing module may be configured to store sound files produced from actual sound clips taken from the microphones during system use. The sound files can then be sent as email attachments or replayed over the phone to the parental user. Such information will allow the parental user to review the sound conditions that existed when a violation was detected, and thus independently determine whether the violation warrants immediate attention.

In most cases, the parental user will prefer to receive notification of severe violations either as they are detected, or by reviewing a log file at a later time. However, under certain severe violation conditions, it may be advisable to disable the vehicle. The preferred embodiment provides for this, as illustrated in FIG. 3. When a severe violation is detected that warrants disabling the vehicle, the logic module 34 (FIG. 2) sends a signal through the input/output interface 32 that communicates with the vehicle computer 24 (FIG. 1) to disable the vehicle. The communications sent to the parental user may be encrypted for privacy.

In addition to performing speaker identification, the speech processing module 36 may also be configured to perform linguistic analysis of the speech being detected. Topic detection is performed by continually monitoring all words spoken, using speaker independent speech recognition and statistical language modeling techniques to identify the semantic information being communicated. If desired, latent semantic indexing can be used to enhance the systems ability to detect topics where different jargon is used. In this regard, many teenagers tend to use specialized jargon or slang words that may not be found in the system lexicon. To address this, the communications module 34 may be configured to obtain lexicon updates via the internet. This would be helpful, for example, when teenage users employ slang terms for prohibited activities or contraband materials that their parents may not understand the meaning of. By updating the system lexicon to include these terms, the parental user could be advised of potentially dangerous situations that might not otherwise be detected.

As previously illustrated, a presently preferred embodiment of the invention utilizes information from the audio system 16 (FIG. 1). The audio system information is one of the inputs supplied to the input/output interface 32 shown in FIG. 2. One purpose for receiving audio system information is to make the speech monitoring system less likely to be jammed by music being played through the vehicles sound system. The preferred embodiment solves this problem by feeding the vehicles sound system audio information into the monitoring system. Because the monitoring system knows what music is being played it can use adaptive noise canceling techniques to remove the music from the monitored speech. The system can also reduce the volume of the music at strategic times (such as between songs) to help improve the systems ability to monitor speech within the vehicle.

The system also makes use of other vehicular sensors to help control how the voice monitoring is performed. In a presently preferred embodiment the car door and seat belt sensors are used as a signal that someone may be getting into or out of the vehicle. Such signal would thus trigger a portion of the monitor control algorithm that determines the number of passengers in the vehicle. Based on the parental users wishes, there may be a restriction on having passengers when the teenage driver is behind the wheel. The system would thus detect additional passengers and notify the parental user accordingly.

In this regard, the system provides two ways to determine the number of passengers. Where seat sensors (such as sensor 12 in FIG. 1) are provided, these serve as direct indicators of the persons occupying the vehicle. Some vehicles may not have seat sensors, or they may have seat sensors only in the front seats of the vehicle. Thus, the preferred embodiment also utilizes the speaker clustering functionality 36a (FIG. 3) to statistically determine how many different "voices" are present in the vehicle. One clustering technique utilizes statistical methods to analyze the frequency content within bursts of continuous speech to discriminate one speaker from another. Because the system includes speaker identification capabilities, more sophisticated statistical analysis of the speech within the vehicle can also be performed. Speakers who have registered with the system would be identified directly through speaker identification techniques. Any remaining speaker data that cannot be associated with identified speakers would then be attributed to other unknown speakers and would be clustered accordingly. In this way, the system generates a statistical measure of how many persons are occupying the vehicle.

Although the embodiment illustrated in FIG. 1 employed a single microphone 20, a more robust system may be implemented that uses multiple microphones. Multiple microphones offer the advantage of being able to ascertain the position of speakers within the vehicle passenger compartment. Direction of arrival data may be obtained from multiple microphones and used as a measure of speaker location. In addition, because the position of the microphones can be known in advance, relative volume information can also be used to ascertain where each speaker is located. This type of information would be useful, for example, if a passenger pretends to be the driver and attempts to identify himself or herself as the driver even though he or she is not the actual driver. Thus, the monitor control algorithms will be able to detect that the purported "driver" is not the actual driver and appropriate actions can be taken.

While the invention has been described in its presently preferred embodiments, it will be understood that the invention is capable of modification without departing from the spirit of the invention as set forth in the appended claims.

What is claimed is:

1. A system for monitoring vehicle occupant behavior, comprising:
    at least one microphone attached to said vehicle to receive audio information from the occupants of said vehicle;
    a speech processing system coupled to said microphones and operable to analyze the speech of said occupants and thereby ascertain information about said occupants;
    a logic processing system having a stored set of behavioral rules and operable to assess compliance with said rules based on said information about said occupants.

2. The system of claim 1 further comprising communication system coupled to said logic processing system and configured to send message information to a third party based on said compliance assessment.

3. The system of claim 2 wherein said communication system includes cellular telephone system adapted to convey said message information to at least one predefined telephone device.

4. The system of claim 2 wherein said communication system includes wireless network system adapted to convey said message information to at least one networked computer system.

5. The system of claim 1 further comprising memory system coupled to said logic processing system and adapted to store violation log information.

6. The system of claim 5 further comprising communication system coupled to said logic processing system and configured to send violation log information to a third party.

7. The system of claim 6 wherein said communication system includes wireless network system adapted to convey said violation information to at least one networked computer system.

8. The system of claim 1 further comprising memory system coupled to said logic processing system and adapted to store behavioral rules used by said logic processing system and having an interface for configuring said behavioral rules.

9. The system of claim 8 wherein said interface is remote from said vehicle.

10. The system of claim 8 further comprising a communication system that interfaces with said memory system and provides a wireless interface for configuring said behavioral rules.

11. The system of claim 1 further comprising adaptive noise canceling system coupled to said speech processing system and having an interface to an audio system of said vehicle, said adaptive noise canceling system being operable to reduce interference between said speech processing system and said audio system during times when said audio system is producing sound within the vehicle.

12. The system of claim 1, wherein said logic processing system performs a monitor control function that distinguishes between at least two different levels of behavioral rule violation.

13. The system of claim 1 wherein said logic processing system performs a monitor control function that identifies at least one predetermined class of behavioral rule violations as a severe violation and that causes communication of a message to a third party when such severe violation is detected.

14. The system of claim 1 further comprising input interface adapted to receive vehicular information selected from the group consisting of audio system information, speedometer information, engine RPM information, GPS information, door open information, door lock information, seat belt latched information, seat occupancy information, and combinations thereof.

15. The system of claim 1 further comprising speaker identification system that prompts a vehicle occupant to provide a speech utterance that is used to identify the speaker.

16. The system of claim 1 further comprising speaker clustering system that statistically analyzes the speech of plural speakers to thereby distinguish the speech of one person from that of another.

17. A method of monitoring behavior of vehicle occupants, comprising:

obtaining audio information from the speech of occupants within the vehicle;

processing said audio information to extract behavioral information about the behavior of the vehicle occupants;

using said behavioral information to assess whether said behavior is in compliance with a predefined set of rules.

18. The method of claim 17 further comprising sending a message to a third party when at least one of said predefined set of rules has been violated.

19. The method of claim 17 further comprising:

obtaining additional behavioral information selected from the group consisting of audio system information, speedometer information, engine RPM information, GPS information, door open information, door lock information, seat belt latched information, seat occupancy information, and combinations thereof, and using said additional behavioral information in assessing whether at least one of said predefined set of rules has been violated.

20. The method of claim 17 further comprising performing speaker identification upon said speech to ascertain information about the identity of said occupants and using said identity information in assessing whether at least one of said predefined set of rules has been violated.

21. The method of claim 17 wherein said processing step includes using automatic speech recognition to generate text information from the speech of said vehicle occupants and using said text information to assess whether said behavior is in compliance with said predefined set of rules.

22. The method of claim 21 further comprising processing said text information to perform topic detection to define at least a portion of said behavioral information.

23. The method of claim 17 further comprising processing said audio information by storing at least a portion of said audio information for replay at a later time.

24. The method of claim 23 further comprising selectively flagging said portions of said audio information for use in later accessing said stored portion of said audio information.

25. The method of claim 24 wherein said selective flagging is performed by using automatic speech recognition.

26. The method of claim 17 further comprising performing speaker clustering to generate information from which the number of vehicle occupants is inferred.

27. The method of claim 26 wherein said number of vehicle occupants inferred is used in connection with said extracted behavioral information to assess whether said behavior is in compliance with a predefined set of rules.

* * * * *